(12) United States Patent
Sato

(10) Patent No.: US 12,013,072 B2
(45) Date of Patent: Jun. 18, 2024

(54) FLUID SHUT-OFF SYSTEM AND SHUT-OFF METHOD

(71) Applicant: SUIKEN Co., Ltd., Shiga (JP)

(72) Inventor: Toshiyuki Sato, Shiga (JP)

(73) Assignee: SUIKEN Co., Ltd., Shiga (JP)

(\*) Notice: Subject to any disclaimer, the term of this patent is extended or adjusted under 35 U.S.C. 154(b) by 152 days.

(21) Appl. No.: 17/802,186

(22) PCT Filed: Feb. 19, 2021

(86) PCT No.: PCT/JP2021/006294
§ 371 (c)(1),
(2) Date: Aug. 25, 2022

(87) PCT Pub. No.: WO2021/177055
PCT Pub. Date: Sep. 10, 2021

(65) Prior Publication Data
US 2023/0081652 A1  Mar. 16, 2023

(30) Foreign Application Priority Data
Mar. 5, 2020 (JP) .................................. 2020-037588

(51) Int. Cl.
*F16L 55/105* (2006.01)
*B26D 3/16* (2006.01)
*F16K 3/02* (2006.01)

(52) U.S. Cl.
CPC .............. *F16L 55/105* (2013.01); *B26D 3/16* (2013.01); *F16K 3/0281* (2013.01)

(58) Field of Classification Search
CPC ......... F16L 55/105; B26D 3/16; F16K 3/0281
See application file for complete search history.

(56) References Cited

U.S. PATENT DOCUMENTS 4,141,378 A * 2/1979 Wegner ................. F16K 27/044
                                                          137/317
5,074,526 A * 12/1991 Ragsdale ................ F16L 41/06
                                                          251/327

(Continued)

FOREIGN PATENT DOCUMENTS

JP   2009168199 A   7/2009
JP   2013199991 A   10/2013

(Continued)

OTHER PUBLICATIONS

International Search Report mailed Apr. 20, 2021 in corresponding International Application No. PCT/JP2021/006294.

*Primary Examiner* — Kevin R Barss
(74) *Attorney, Agent, or Firm* — Renner, Otto, Boisselle & Sklar, LLP

(57) ABSTRACT

A shut-off system of the present invention includes a straight pipe made of a polyolefin-based material, and a knife gate, wherein: a semicircular arc-shaped first cutting blade is formed on a distal end side of the knife gate to cut open the straight pipe to form a slit-shaped opening; an arc band-shaped sealing portion is formed on a proximal end side of the knife gate to be in contact with cut surfaces of the straight pipe; the knife gate includes a pair of side edge portions that connect the first cutting blade and the sealing portion; the first cutting blade and the side edge portions bite into an inner circumference surface of the straight pipe along the inner circumference surface; the knife gate is formed in a flat plate shape having a first surface and a second surface, extending from the first cutting blade to the sealing portion and between the pair of side edge portions; the opening extends in a circumferential direction on the straight pipe; and the sealing portion extends from one end of the opening to the other end thereof, and extends from the inner circum- (Continued)

ference surface to an outermost surface, which is on an outermost side, of the straight pipe.

11 Claims, 7 Drawing Sheets

(56) References Cited

U.S. PATENT DOCUMENTS

| | | | | |
|---|---|---|---|---|
| 5,494,079 | A | | 2/1996 | Tiedemann |
| 5,524,663 | A | | 6/1996 | Walsh et al. |
| 5,732,728 | A | * | 3/1998 | Maichel ................ F16L 55/105 |
| | | | | 251/327 |
| 6,308,726 | B2 | * | 10/2001 | Sato ...................... F16L 55/105 |
| | | | | 251/327 |
| 6,615,859 | B2 | * | 9/2003 | Sato ........................ F16L 41/06 |
| | | | | 408/1 R |
| 6,622,747 | B2 | * | 9/2003 | Sato ........................ F16L 41/04 |
| | | | | 137/15.09 |
| 6,776,184 | B1 | * | 8/2004 | Maichel ................ F16L 55/105 |
| | | | | 251/327 |
| 7,225,827 | B2 | * | 6/2007 | Maichel ................ F16L 55/105 |
| | | | | 251/327 |
| 2020/0408346 | A1 | | 12/2020 | Sato |
| 2021/0254761 | A1 | | 8/2021 | Sato |

FOREIGN PATENT DOCUMENTS

| | | |
|---|---|---|
| WO | 2019167646 A1 | 9/2019 |
| WO | 2020/013008 A1 | 1/2020 |

\* cited by examiner

FIG. 1
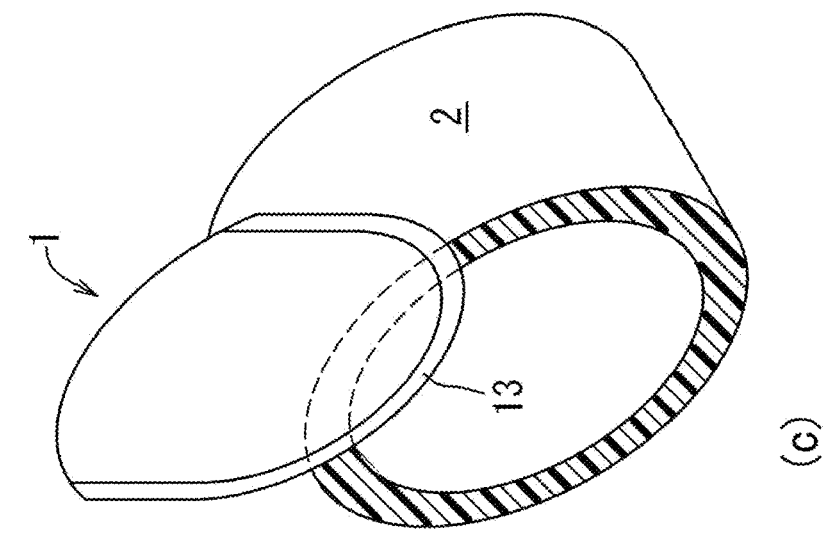
(c)
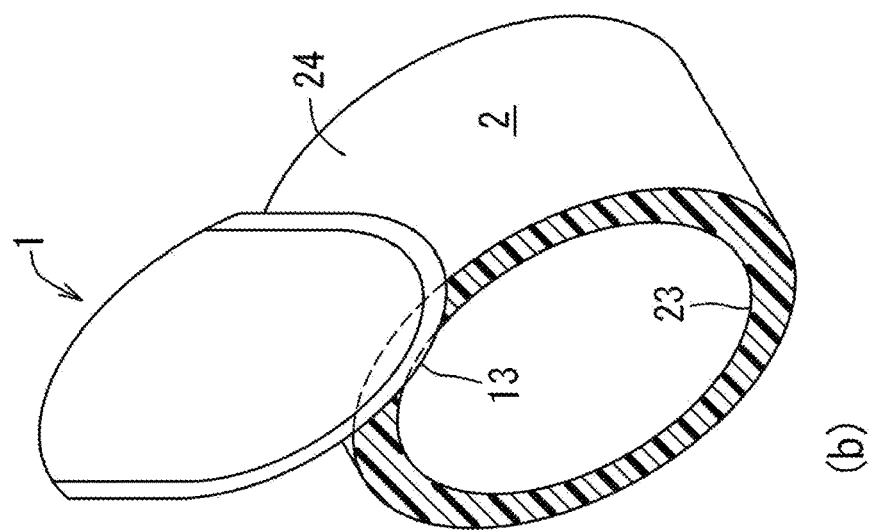
(b)
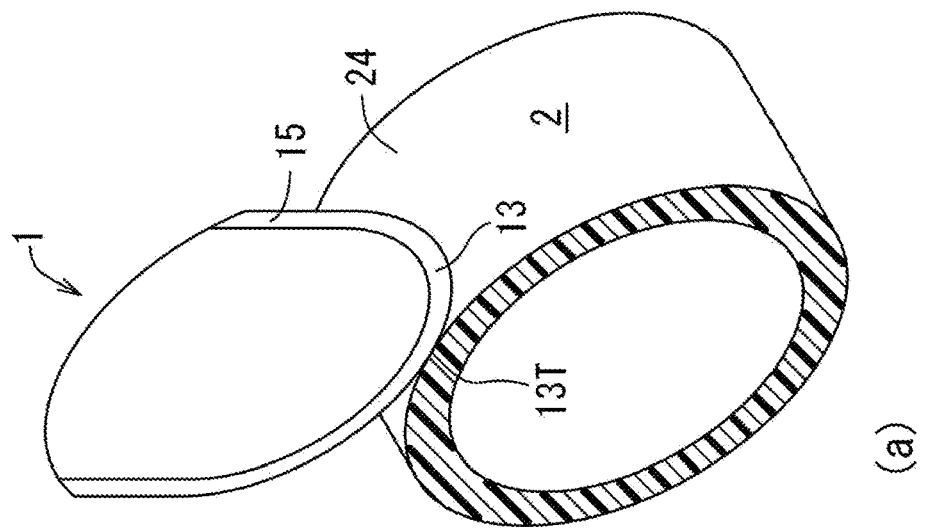
(a)

FIG. 3
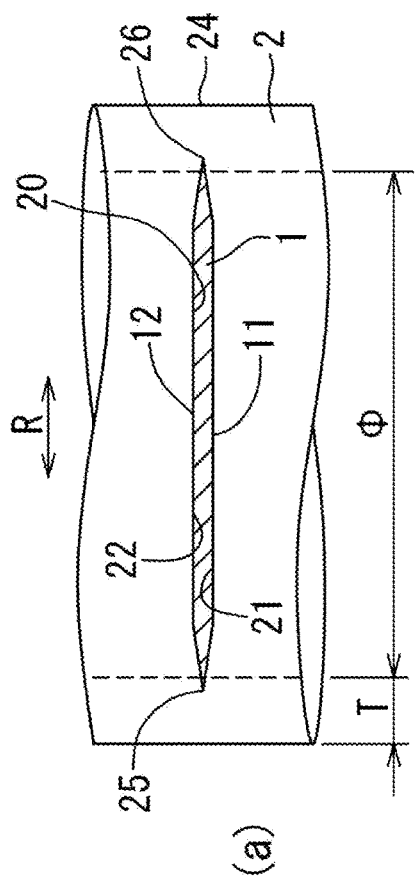
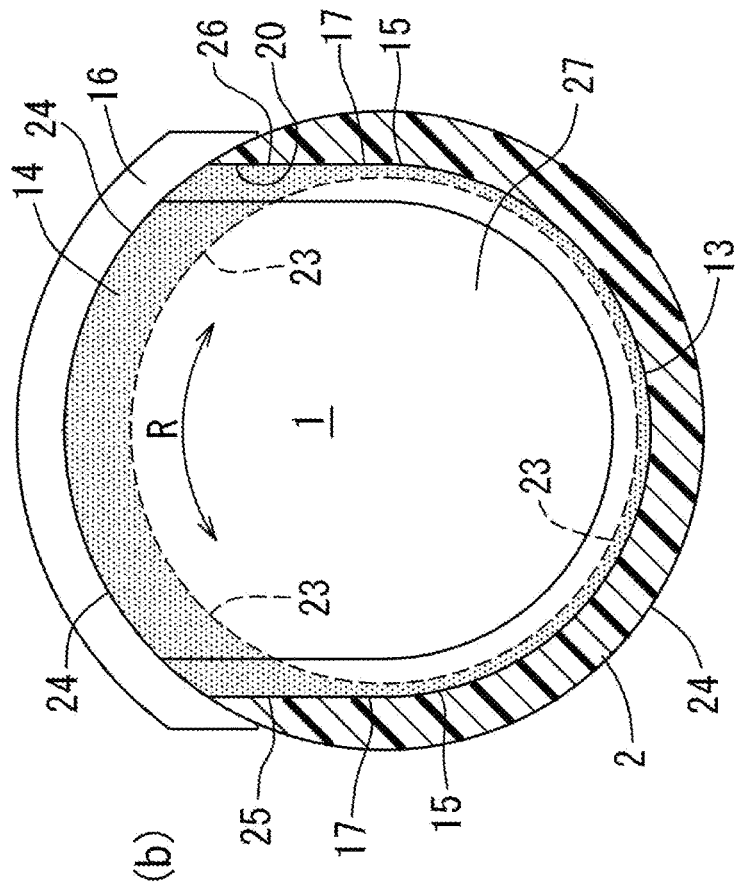
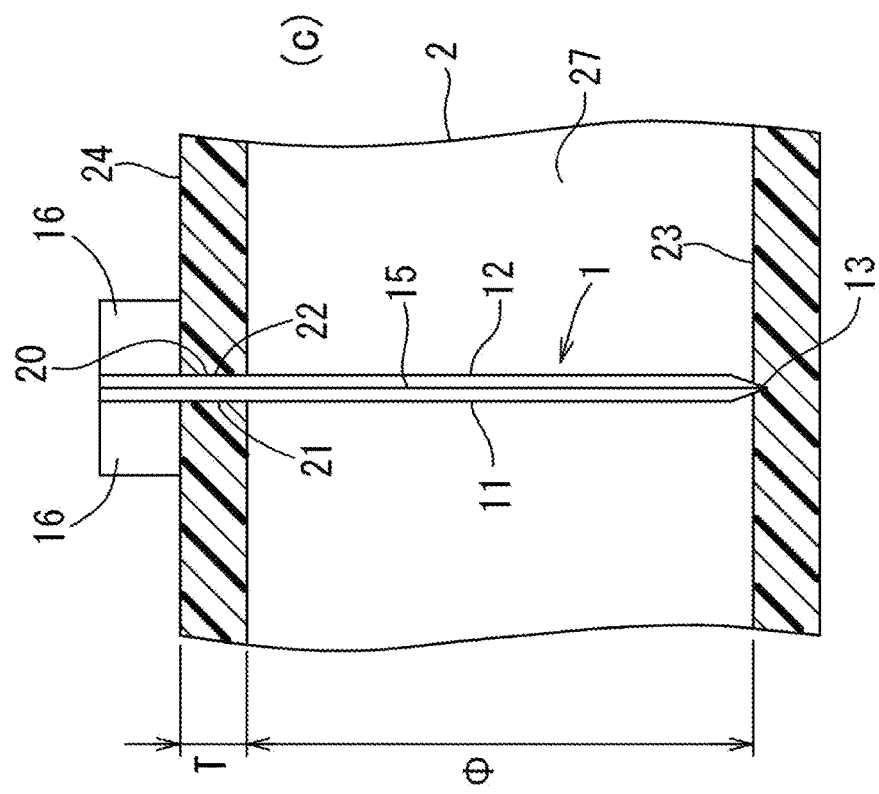

FLUID SHUT-OFF SYSTEM AND SHUT-OFF METHOD

TECHNICAL FIELD

The present invention relates to a fluid shut-off system and shut-off method, wherein a knife gate is attached to a straight pipe made of a polyolefin-based material.

BACKGROUND ART

Methods and devices for installing knife gates in existing and new polyethylene (PE) pipes have been known in the art (see the first and second patent documents). According to the inventions disclosed in the first and second patent documents, identified below, a bottomed groove is formed in a straight pipe with an end mill beforehand to form a thin skin on the straight pipe, then the knife gate penetrates the thin skin area to form an opening, and the knife gate moves into the straight pipe to stop fluid flow.

CITATION LIST

Patent Document

[FIRST PATENT DOCUMENT] WO2020/013008 (FIG. 16)
[SECOND PATENT DOCUMENT] WO2019/167646 (FIG. 16)

SUMMARY OF INVENTION

Each of the conventional techniques described above requires a groove to be formed in advance. This requires end mills and power tools to form the groove, and also increases the number of process steps and the construction time.

In each of the conventional techniques described above, it is necessary to seal, with a knife gate, two areas, i.e., a groove formed by cutting the pipe with an end mill in advance and an opening that is cut open by a knife gate. This will likely complicate the water sealing structure, e.g., by requiring a knife gate with a rubber packing secured thereto.

Thus, it is an object of the present invention to provide a fluid shut-off system and shut-off method, which can solve these problems.

Each of the conventional techniques described above fails to disclose cutting open an opening with a knife gate without pre-cutting the pipe, i.e., without forming a thin skin on the pipe.

On the other hand, the applicant proposed to form an elongated opening in a PE pipe with a die cutter (JP2013-199991A). With this experimental example, however, an elongated square cylindrical die cutter could not cut through a PE pipe, and this experiment failed. The reasons for this will be discussed below.

With this experimental example, when an elongated square cylindrical die cutter cuts through a PE pipe, the PE pipe must escape by the thickness of the die cutter blade. However, it is assumed that, it is difficult, for the part of the PE pipe surrounded by the square cylindrical die cutter, to be deformed or compressed, and therefore the die cutter could not cut through the PE pipe.

A shut-off system of the present invention is a shut-off system including a straight pipe 2 made of a polyolefin-based material, and a flat plate-shaped knife gate 1 that stops flow of fluid in the straight pipe 2, wherein:

a semicircular arc-shaped first cutting blade 13 is formed on a distal end side of the knife gate 1 to cut open the straight pipe 2 to form a slit-shaped opening 20 that extends elongated in a circumferential direction R of the straight pipe 2;

an arc band-shaped sealing portion 14 is formed on a proximal end side of the knife gate 1 to be in contact with cut surfaces 21, 22 of the straight pipe 2 defining the opening 20;

the knife gate 1 includes a pair of side edge portions 15, 15 that connect the semicircular arc-shaped first cutting blade 13 and the arc band-shaped sealing portion 14;

the semicircular arc-shaped first cutting blade 13 and the pair of side edge portions 15, 15 of the knife gate 1 bite into an inner circumference surface 23 of the straight pipe 2 along the inner circumference surface 23;

the knife gate 1 is formed in a flat plate shape having a first surface 11 and a second surface 12 opposite to the first surface 11, extending from the first cutting blade 13 to the sealing portion 14 and between the pair of side edge portions 15, 15;

the slit-shaped opening 20 extends in a circumferential direction R on the straight pipe 1; and the sealing portion 14 of the knife gate 1 is formed in the arc band shape, extending from one end 25 of the opening 20 in the circumferential direction R to the other end 26 thereof, and extending from the inner circumference surface 23 to an outermost surface 24, which is on an outermost side, of the straight pipe 1 from the one end 25 to the other end 26.

On the other hand, a shut-off method of the present invention is a fluid shut-off method for stopping, with a flat plate-shaped knife gate 1, flow of fluid in a straight pipe 2 made of a polyolefin-based material, wherein:

the flat plate-shaped knife gate 1 includes a first surface 11 and a second surface 12 opposite to the first surface 11;

a semicircular arc-shaped first cutting blade 13 is formed on a distal end side of the knife gate 1 to cut open the straight pipe 2 to form a slit-shaped opening 20 that extends elongated in a circumferential direction R of the straight pipe 2;

an arc band-shaped sealing portion 14 is formed on a proximal end side of the knife gate 1 to be in contact with cut surfaces 21, 22 of the straight pipe 2 defining the opening 20;

the shut-off method includes:

a step in which a top 13T of the first cutting blade 13 contacts an outermost surface 24, which is on an outermost side, of the straight pipe 2;

a step in which the first cutting blade 13 cuts through the straight pipe 2 from the outermost surface 24 toward a space 27 inside the straight pipe 2; and a step in which an entirety of the semicircular arc-shaped first cutting blade 13 bites into a half circumferential portion of an inner circumference surface 23 of the straight pipe 2; and after these steps, the semicircular arc-shaped first cutting blade 13 of the knife gate 1 bites into the inner circumference surface 23 of the straight pipe 2 and the sealing portion 14 contacts the cut surfaces 21, 22, thereby stopping flow of fluid in the straight pipe 2.

According to the present invention, an opening is cut open in the straight pipe with a flat plate-shaped knife gate instead of a die cutter. Therefore, there is room for the straight pipe to escape or deform against the first surface and the second surface of the knife gate, thus allowing the knife gate to cut through the straight pipe.

According to the present invention, the first cutting blade contacts the outermost surface of the straight pipe, on which a groove is not formed in advance, and the first cutting blade cuts open the straight pipe. Therefore, the step and tools forming a groove on the straight pipes are unnecessary. Therefore, the cost of the system decreases and the construction time becomes significantly shorter.

The first cutting blade and the side edge portions of the flat plate-shaped knife gate bite into the inner circumference surface of the straight pipe, and the arc band-shaped sealing portion contacts the cut surfaces of the straight pipe to stop the flow of fluid. Thus, a rubber packing is not provided in the knife gate, simplifying the structure of the knife gate and significantly reducing the cost.

In the present invention, a polyolefin-based material refers to polyethylene, polypropylene, polybdenum, etc.

BRIEF DESCRIPTION OF THE DRAWINGS

FIG. 1 is a schematic perspective view of a present system showing the contacting step and the cut-through step in the shut-off method of the present invention.

FIGS. 3(a), 3(b) and 3(c) are a schematic plan view, a cross sectional view and a longitudinal sectional view, respectively, showing an embodiment of the present system.

In FIG. 3(b), FIG. 5(a) and FIG. 5(b), the contact area between the knife gate and the PE pipe is drawn with a dot pattern.

DESCRIPTION OF EMBODIMENTS

Figure 2:
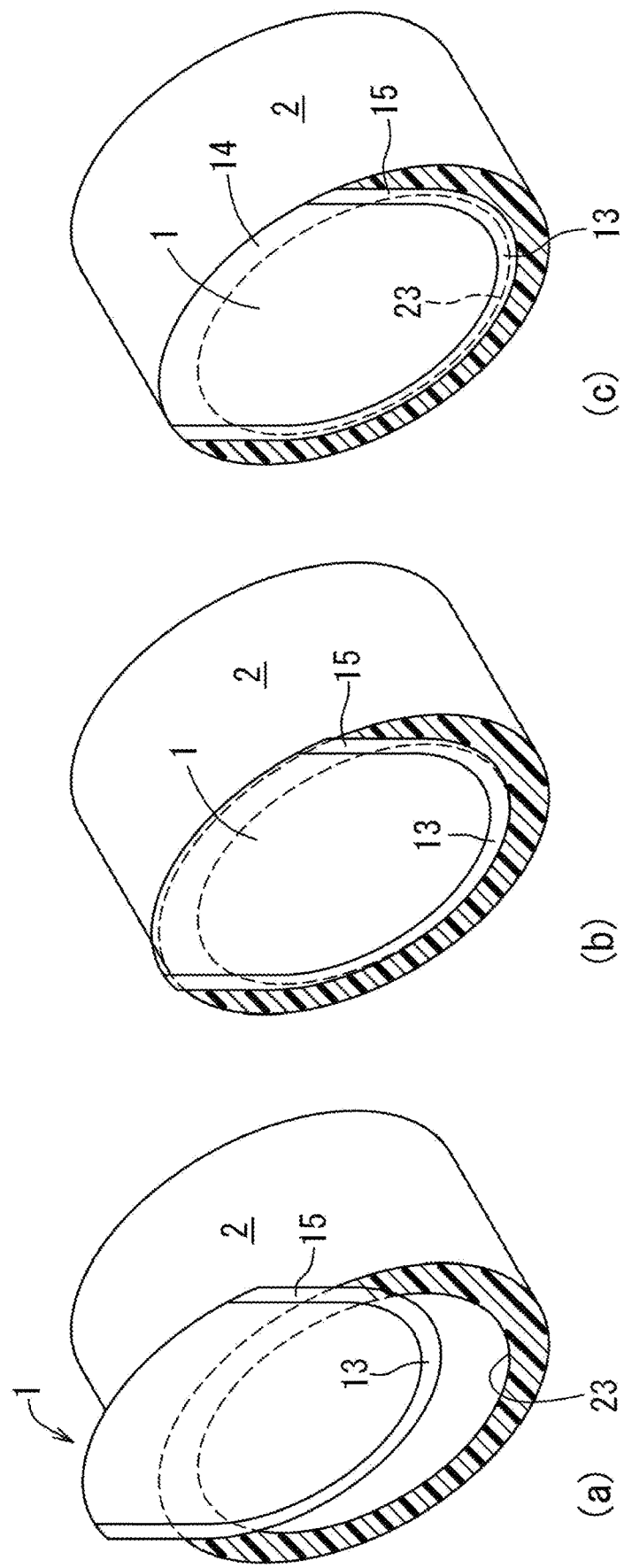
FIG. 2 is a schematic perspective view of a present system showing the cut-through step and the biting step thereof.

In a preferred system, the pair of side edge portions 15, 15 each have a second cutting blade 17 continuous with the first cutting blade 13.

In this case, since the second cutting blade is formed on each of the side edge portions continuous with the first cutting blade, the side edge portions smoothly move into the ends of the slit-shaped opening, which has been cut by the first cutting blade.

More preferably, opposite ends of the sealing portion 14 that are in contact with the pair of ends 25, 26 of the opening 20 are sharply pointed in a shape of a cutting blade.

In this case, the shape of the sealing portion 14 of the knife gate at opposite ends thereof in a flat cross section matches the shape of the ends 25, 25 of the opening 20 in a flat cross section. Therefore, the water sealing function is enhanced.

Preferably, a width between the second cutting blade and the second cutting blade formed on the pair of side edge portions 15, 15 is greater than an inner diameter φ of the straight pipe 2.

In this case, since the width between the second cutting blades of the pair of side edge portions is greater than the inner diameter of the straight pipe 2, it is possible to achieve water sealing even if the knife gate is misaligned with respect to the straight pipe.

Preferably, the shut-off system further includes:
a case 30 enclosing a portion of the straight pipe 2 and the knife gate 1; and
a valve rod 43 for moving the knife gate 1 until the first cutting blade 13 of the knife gate 1 arranged in the case 30 cuts open the straight pipe 1 to form the opening 20, and the first cutting blade 13 bites along the inner circumference surface 23.

Since the present system uses a knife gate to stop the fluid flow through a PE pipe, a sealed case may not be required as long as a force to cut through the PE pipe is obtained. However, provision of a case and a valve rod for cutting through a PE pipe will facilitate the operation even for non-skilled workers.

In a preferred shut-off method, the top 13T of the first cutting blade 13 contacts the outermost surface 24 of the straight pipe 2 without cutting the straight pipe 2 to form a groove in advance.

In this case, there is no need for equipment and steps for cutting the straight pipe, thereby reducing the cost and shortening the construction time, and the construction is easy and can be done even by a non-skilled worker.

More preferably, the shut-off method includes, after the biting step, a step in which a stopper 16 attached to the knife gate 1 contacts the outermost surface 24 of the straight pipe 2 to prevent the knife gate 1 from cutting further through.

Any feature illustrated and/or depicted in conjunction with one of the aspects described above or the following embodiments may be used in the same or similar form in one or more of alternative aspects or alternative embodiments, and/or may be used in combination with, or in place of, any feature of the alternative aspects or embodiments.

Embodiments

The present invention will be understood more clearly from the following description of preferred embodiments taken in conjunction with the accompanying drawings. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Embodiments of the present invention will now be described with reference to the drawings.

First, an outline of the shutdown method will be described.

FIG. 1 and FIG. 2 show an outline of the shut-off method.

The present shut-off method includes the step in which a top 13T of a first cutting blade 13 of a knife gate 1 of FIG. 1(a) contacts an outermost surface 24 of a straight pipe 2, the cut-through step of FIG. 1(b) to FIG. 2(b), and the biting step of FIG. 2(c).

Note that in FIG. 1 and FIG. 2, the surface of the straight pipe 2 that is not cut by the knife gate 1 is hatched.

The straight pipe 2 of FIG. 1 is made of a polyolefin-based material such as a PE pipe. On the other hand, the knife gate 1 is made of a metal such as stainless steel or ceramic.

Next, an example of the present shut-off system will be described.

The straight pipe 2 of FIG. 3(c) has an inner circumference surface 23 with an even uniform inner diameter φ, an outermost surface 24 with an even uniform outer diameter, and an even uniform wall thickness T (FIG. 3(a)). That is, the straight pipe 2 is a resin pipe extruded from a mouthpiece. An opening 20 is formed in the straight pipe 2.

As shown in FIG. 3(a), the slit-shaped opening 20 that is cut open by the knife gate 1 is formed in the straight pipe 2. As shown in FIG. 3(b), the opening 20 extends in the circumferential direction R of the straight pipe 2. The ends 25, 26 of the opening 20 of FIG. 3(a) are each in a sharply pointed (tapered) shape like the knife gate 1.

The knife gate 1 of FIG. 3 is formed in a flat plate shape that stops the flow of fluid flowing through the internal space 27 in the straight pipe 2. This knife gate 1 has the first cutting blade 13, a sealing portion 14 and a pair of side edge portions 15, 15.

The first cutting blade 13 of FIG. 3(b) has an outwardly-protruding semicircular arc shape and is formed on the distal end side of the knife gate 1, and cuts open the straight pipe 2 to form the slit-shaped opening 20 that extends elongated in the circumferential direction R of the straight pipe 2.

The sealing portion 14 has an arc band shape and is formed on the proximal end side of the knife gate 1, and is in contact with the cut surfaces 21, 22 of the straight pipe 2 defining the opening 20 of FIG. 3(a).

The pair of side edge portions 15, 15 of FIG. 3(b) are provided between the semicircular arc-shaped first cutting blade 13 and the arc band-shaped sealing portion 14 to connect the sealing portion 14 and the first cutting blade 13.

The semicircular arc-shaped first cutting blade 13 and the side edge portions 15, 15 of the knife gate 1 bite into the inner circumferential surface 23 of the straight pipe 2 along the inner circumferential surface 23.

The knife gate 1 of FIG. 3(b) is formed in a flat plate shape having a first surface 11 and a second surface 12 opposite to the first surface 11, as shown in FIG. 3(a), extending from the first cutting blade 13 to the sealing portion 14 and between the pair of side edge portions 15, 15.

As described above, the slit-shaped opening 20 of FIGS. 3(a) and 3(b) extends in the circumferential direction R on the straight pipe 1. On the other hand, the sealing portion 14 of the knife gate 1 is formed in a semicircular arc shape, extending from one end 25 of the opening 20 in the circumferential direction R to the other end 26 thereof, and extending from the inner circumferential surface 23 to the outermost surface 24, which is on the outermost side, of the straight pipe 1 from the one end 25 to the other end 26.

In FIG. 3(b), the pair of side edge portions 15, 15 may each have a second cutting blade 17 continuous with the first cutting blade 13.

In FIG. 3(a), the opposite ends of the sealing portion 14 of the knife gate 1 that are in contact with the pair of ends 25, 26 of the opening 20 are sharply pointed in the shape of a cutting blade.

As shown in FIG. 3(b), the distance between the second cutting blade 17 and the second cutting blade 17 formed on the pair of side edge portions 15, 15 is greater than the inner diameter φ of the straight pipe 2 of FIG. 3(a).

A stopper 16 may be attached to the knife gate 1 as shown in FIGS. 3(b) and 3(c). The stopper 16 prevents the first cutting blade 13, which has bitten into the half circumferential portion of the inner circumferential surface 23, from cutting further through after the first cutting blade 13 bites into the inner circumferential surface 23. Preferably, the stopper 16 is made of metal and includes a female thread to which the valve rod is screwed.

Next, the shut-off method will be described in detail.

Figure 4:
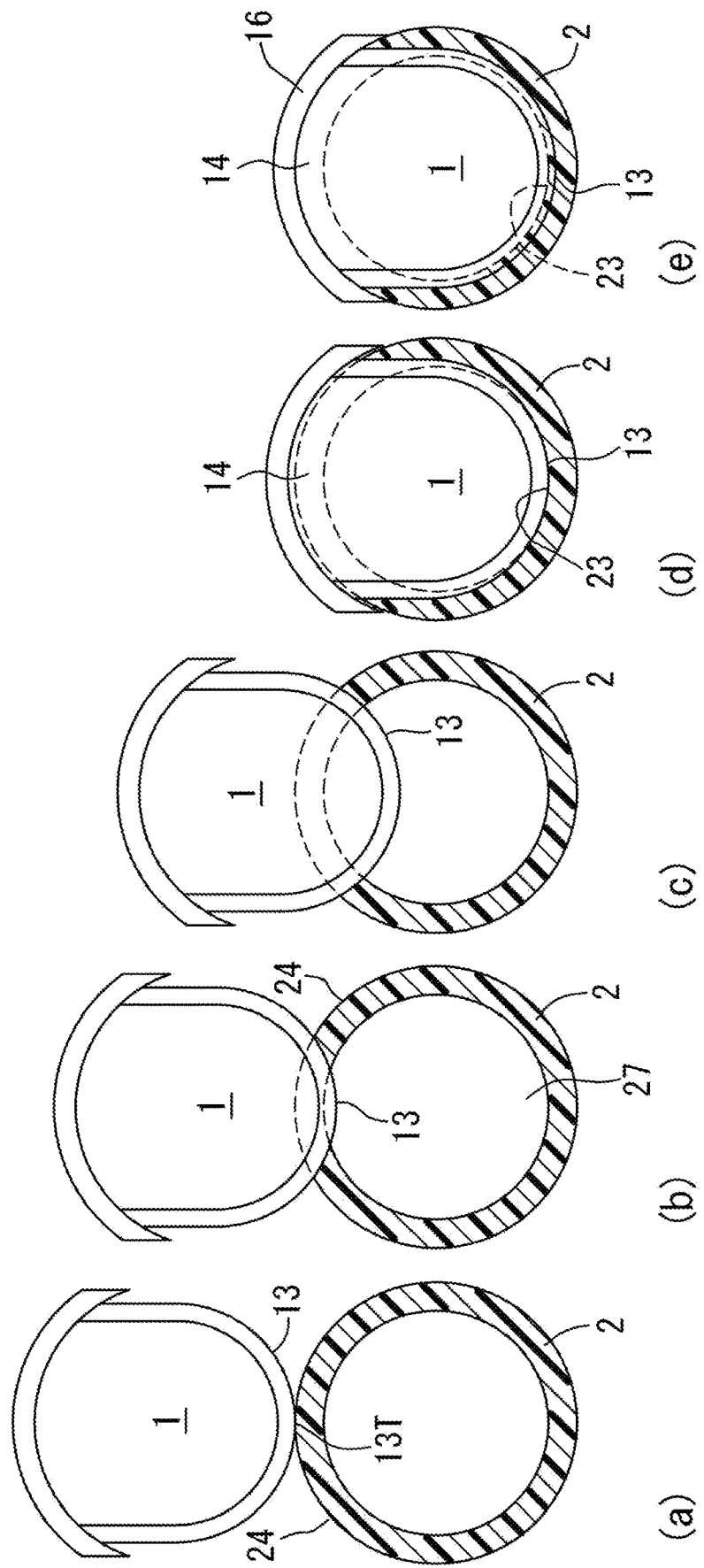
FIG. 4 is a schematic cross sectional view of the present system showing an embodiment of the present shut-off method.

As shown in FIG. 4(a), first, the top 13T of the first cutting blade 13 contacts the outermost surface 24 of the straight pipe 2. At this time, the straight pipe 2 is pushed by the first cutting blade 13 and deformed into a slightly flattened shape.

The top 13T of the first cutting blade 13 contacts the outermost surface 24 of the straight pipe 2 without cutting a groove in advance in the straight pipe 2.

Then, as shown in FIG. 4(b) to FIG. 4(d), the first cutting blade 13 cuts through the straight pipe 2 from the outermost surface 24 toward the space 27 inside the straight pipe 2 and then cuts forward. Also during this cutting process, the straight pipe 2 is also slightly deformed.

Then, as shown in FIGS. 4(d) and 4(e), the entirety of the semicircular arc-shaped first cutting blade 13 bites into the half circumferential portion of the inner circumference surface 23 of the straight pipe 2. That is, the semicircular arc-shaped first cutting blade 13 bites into the half circumferential portion of the inner circumferential surface 23 of the straight pipe 2 over its entire length.

Thus, the semicircular arc-shaped first cutting blade 13 of the knife gate 1 bites into the inner circumferential surface 23 of the straight pipe 2, and the sealing portion 14 of FIG. 3 contacts the cut surfaces 21, 22, thereby stopping the flow of fluid in the straight pipe 2.

As shown in FIGS. 3(b) and 3(c), after the biting step, the stopper 16 attached to the knife gate 1 contacts the outermost surface 24 of the straight pipe 2 to prevent the knife gate 1 from cutting further through.

Figure 5:
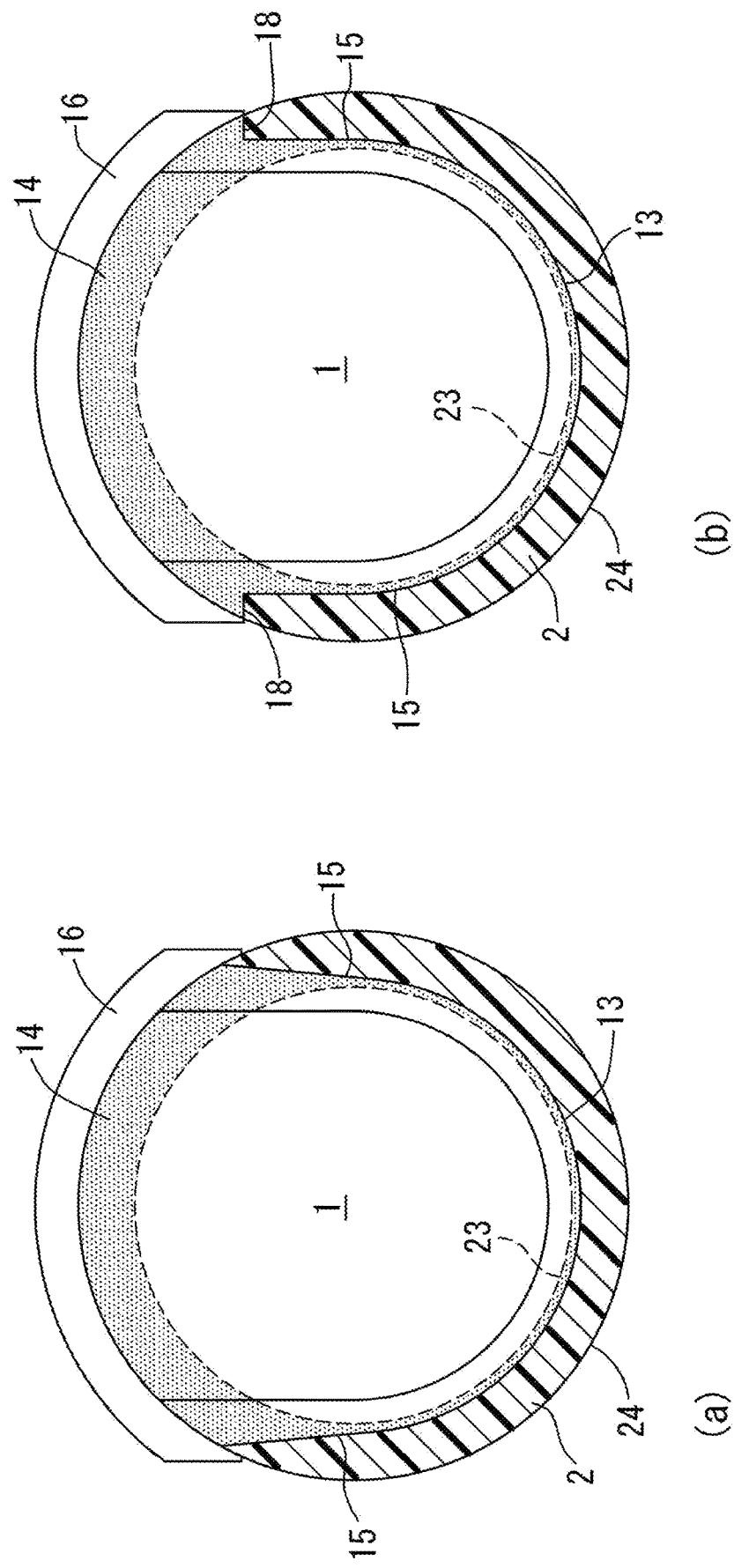
FIG. 5 is a cross sectional view showing another example of the present system.

FIGS. 5(a) and 5(b) show another example of the present system.

As shown in FIG. 5(a), the pair of cutting blade-shaped side edge portions 15, 15 of the knife gate 1 may be slightly tapered and configured to cut through the straight pipe 2. In this case, the water sealing capability will be further enhanced.

A third cutting blade 18 may be provided at both ends of the sealing portion 14, as shown in FIG. 5(b).

Next, an example structure of the shut-off system will be described.

Figure 6:
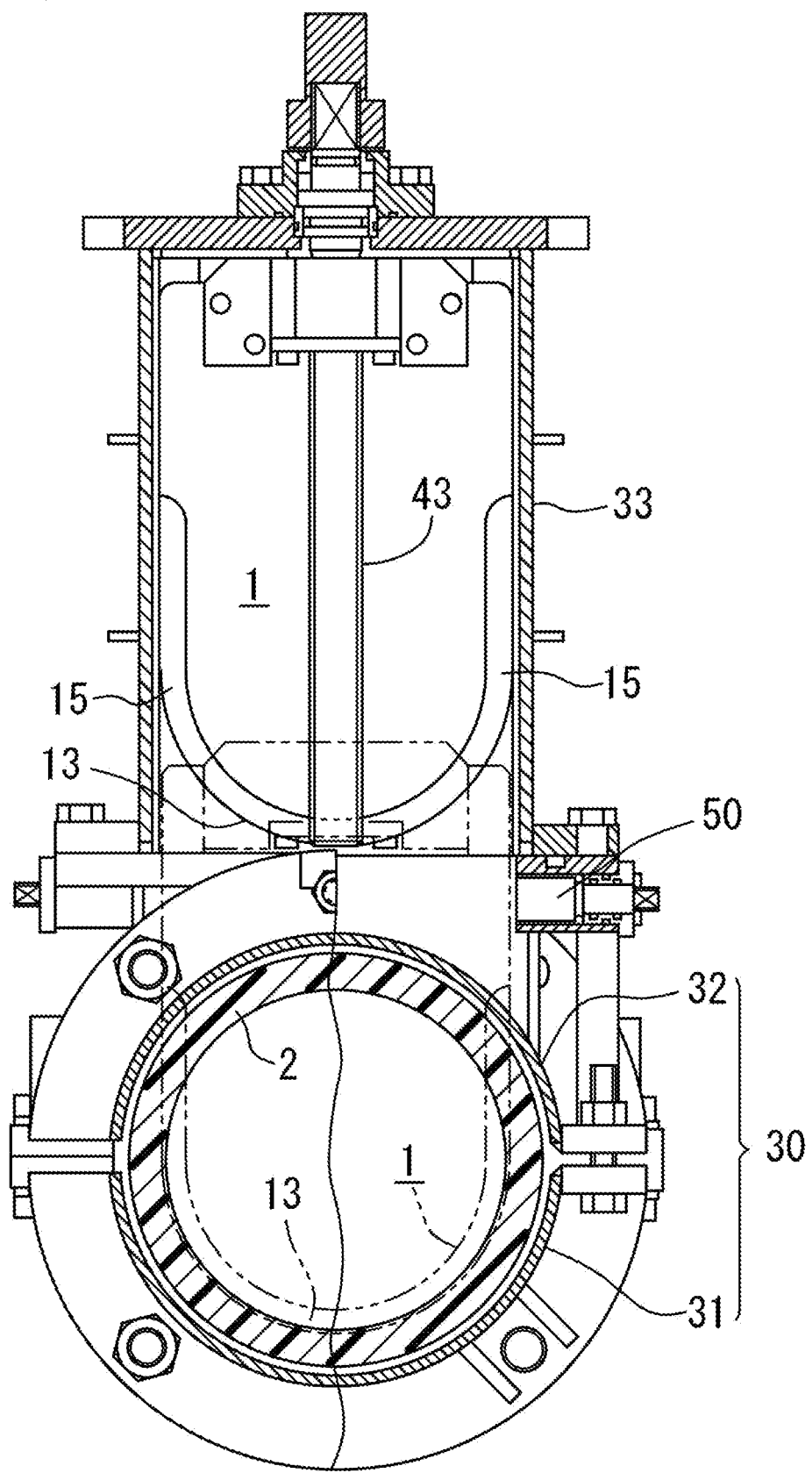
FIG. 6 is a cross sectional view of the present system, which can be employed as an experimental example.
Figure 7:
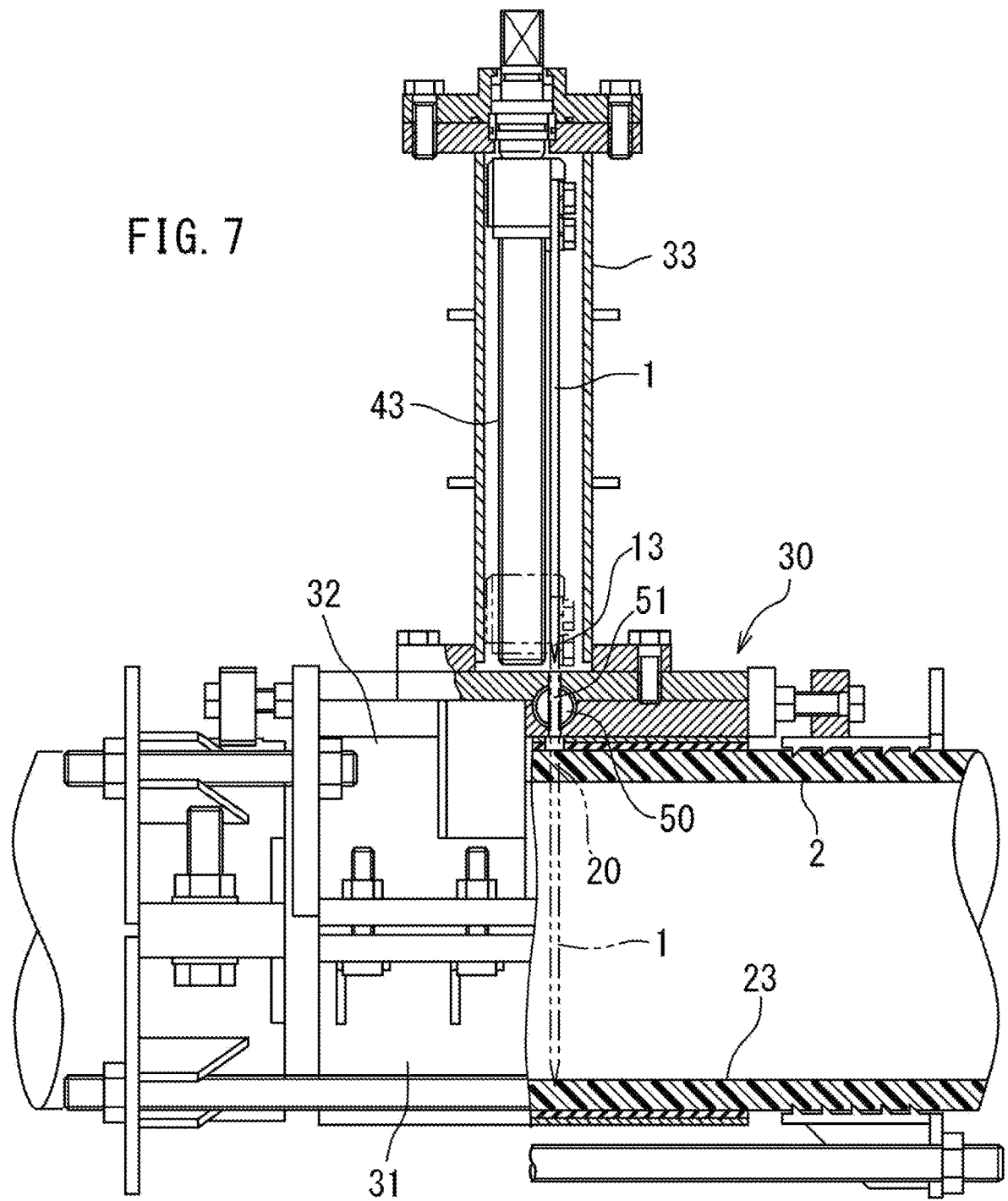
FIG. 7 is a longitudinal sectional view thereof.

The system shown in FIG. 6 and FIG. 7 is a structure that is suitable for producing only one product for testing.

In FIG. 6 and FIG. 7, a sealed case 30 encloses a portion of the straight pipe 2 and the knife gate 1 in a watertight manner. The case 30 may be divided into first and second divided cases 31, 32. A valve box 33 is coupled to the second divided case 32.

The valve box 33 accommodates the knife gate 1 in the open valve state and the valve rod 43. The valve rod 43 has a well-known structure, and the first cutting blade 13 of the knife gate 1 arranged in the case 30 cuts open the straight pipe 2 to form the opening 20, and moves the knife gate 1 until the first cutting blade 13 bites along the inner circumference surface 23.

A well-known operation valve 50 may be provided in the sealed case 30 to partition between the second divided case 32 and the valve box 33. The operation valve 50 may be a rod-shaped valve and may have an access slit 51 through which the knife gate 1 proceeds.

The case 30, etc., may be made of cast metal. In FIG. 7, the knife gate 1 is shown in a state where the knife gate 1 has been brought back into the valve box 33 after forming the opening 20 in the straight pipe 2.

The applicant conducted a water sealing test by modifying a cast case (manufactured by Suiken Co., Ltd.), and cutting the straight pipe 2 with the knife gate 1 as shown in FIG. 6 and FIG. 7. As a result, it was confirmed that the knife gate 1 could cut open the straight pipe 2 (PE pipe) and the knife gate 1 could move into the pipe until the first cutting blade 13 reaches the inner circumference surface 23. It can be assumed that the reason why the knife gate 1 can cut through in this way without generating swarf is due to the deformation of the PE pipe as the knife gate 1 cuts through.

When the PE pipe was filled with water as a fluid to check its water sealing capability, there was no leakage that would interfere with the construction work.

While preferred embodiments have been described above with reference to the drawings, various obvious changes and modifications will readily occur to those skilled in the art upon reading the present specification.

For example, the knife gate may be made of ceramic.

The stopper may be optional.

Thus, such changes and modifications are deemed to fall within the scope of the present invention, which is defined by the appended claims.

INDUSTRIAL APPLICABILITY

The system and method of the present invention can be used to insert a knife gate in a line of piping, such as water or gas, and to stop the flow of fluid by the inserted knife gate.

The process of the present invention can be used when inserting a valve in uninterrupted flow as well as when installing new piping.

REFERENCE SIGNS LIST

1: Knife gate, 11: First surface, 12: Second surface, 13: First cutting blade, 13T: Top, 14: Sealing portion

15: Side edge portion, 16: Stopper, 17: Second cutting blade, 18: Third cutting blade

2: Straight pipe, 20: Opening, 21,22: Cut surface, 23: Inner circumference surface, 24: Outermost surface

25,26: End, 27: Inside space

30: Case, 31,32: First and second divided cases, 33: Valve box

43: Valve rod

50: Operation valve, 51: Access slit

R: Circumferential direction, T: Wall thickness, φ: Inner diameter

The invention claimed is:

1. A shut-off system comprising a straight pipe made of a polyolefin-based material, and a flat plate-shaped knife gate that stops flow of fluid in the straight pipe, wherein:
    a semicircular arc-shaped first cutting blade is formed on a distal end side of the knife gate to cut open the straight pipe to form a slit-shaped opening that extends elongated in a circumferential direction of the straight pipe;
    an arc band-shaped sealing portion is formed on a proximal end side of the knife gate to be in contact with cut surfaces, of the straight pipe, the cut surfaces defining the opening;
    the knife gate includes a pair of side edge portions, that connect the semicircular arc-shaped first cutting blade and the arc band-shaped sealing portion;
    the semicircular arc-shaped first cutting blade and the pair of side edge portions, of the knife gate bite into an inner circumference surface of the straight pipe along the inner circumference surface;
    the knife gate is formed in a flat plate shape having a first surface and a second surface opposite to the first surface,
    the first surface and the second surface each extending from the first cutting blade to the sealing portion and between the pair of side edge portions;
    the slit-shaped opening extends in the circumferential direction on the straight pipe; and
    the sealing portion of the knife gate is formed in the arc band shape, extending from one end of the opening in the circumferential direction to another end of the opening, and extending from the inner circumference surface to an outermost surface, which is on an outermost side, of the straight pipe from the one end to the other end.

2. The shut-off system according to claim 1, wherein the pair of side edge portions, each have a second cutting blade continuous with the first cutting blade.

3. The shut-off system according to claim 2, wherein opposite ends of the sealing portion that are in contact with the respective ends of the opening are sharply pointed in a shape of a cutting blade.

4. The shut-off system according to claim 3, further comprising:
    a case enclosing a portion of the straight pipe and the knife gate; and
    a valve rod for moving the knife gate until the first cutting blade of the knife gate arranged in the case cuts open the straight pipe to form the opening, and the first cutting blade bites along the inner circumference surface.

5. The shut-off system according to claim 2, wherein a width between the second cutting blades formed on the pair of side edge portions is greater than an inner diameter φ of the straight pipe.

6. The shut-off system according to claim 5, further comprising:
    a case enclosing a portion of the straight pipe and the knife gate; and
    a valve rod for moving the knife gate until the first cutting blade of the knife gate arranged in the case cuts open the straight pipe to form the opening, and the first cutting blade bites along the inner circumference surface.

7. The shut-off system according to claim 2, further comprising:
    a case enclosing a portion of the straight pipe and the knife gate; and
    a valve rod for moving the knife gate until the first cutting blade of the knife gate arranged in the case cuts open the straight pipe to form the opening, and the first cutting blade bites along the inner circumference surface.

8. The shut-off system according to claim 1, further comprising:
    a case enclosing a portion of the straight pipe and the knife gate; and
    a valve rod for moving the knife gate until the first cutting blade of the knife gate arranged in the case cuts open the straight pipe to form the opening, and the first cutting blade bites along the inner circumference surface.

9. A fluid shut-off method for stopping, with a flat plate-shaped knife gate, flow of fluid in a straight pipe made of a polyolefin-based material, wherein:
    the flat plate-shaped knife gate includes a first surface and a second surface opposite to the first surface;
    a semicircular arc-shaped first cutting blade is formed on a distal end side of the knife gate to cut open the straight pipe to form a slit-shaped opening that extends elongated in a circumferential direction of the straight pipe;
    an arc band-shaped sealing portion is formed on a proximal end side of the knife gate to be in contact with cut surfaces, of the straight pipe, the cut surfaces defining the opening;

the shut-off method includes:
a step in which a top of the first cutting blade contacts an outermost surface, which is on an outermost side, of the straight pipe;
a step in which the first cutting blade cuts through the straight pipe from the outermost surface toward a space inside the straight pipe; and
a step in which an entirety of the semicircular arc-shaped first cutting blade bites into a half circumferential portion of an inner circumference surface of the straight pipe; and
after these steps,
the semicircular arc-shaped first cutting blade of the knife gate bites into the inner circumference surface of the straight pipe and the sealing portion contacts the cut surfaces, thereby stopping flow of fluid in the straight pipe.

10. The shut-off method according to claim 9, wherein the top of the first cutting blade contacts the outermost surface of the straight pipe without forming a groove cut in the straight pipe in advance.

11. The shut-off method according to claim 10, comprising, after the biting step, a step in which a stopper attached to the knife gate contacts the outermost surface of the straight pipe to prevent the first cutting blade, which has bitten into the half circumferential portion of the inner circumference surface of the straight pipe, from cutting further through.

* * * * *